(No Model.)
C. L. COFFIN.
METHOD OF ELECTRICALLY HEATING METAL.
No. 530,021. Patented Nov. 27, 1894.
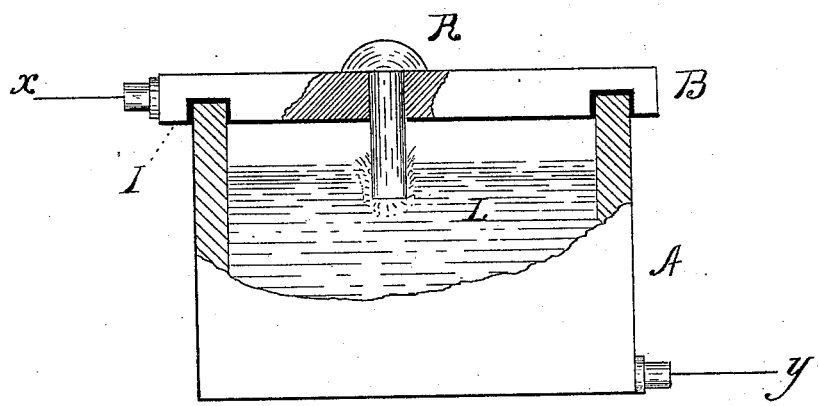
WITNESSES
INVENTOR
Charles L. Coffin

UNITED STATES PATENT OFFICE.

CHARLES L. COFFIN, OF DETROIT, MICHIGAN.

METHOD OF ELECTRICALLY HEATING METAL.

SPECIFICATION forming part of Letters Patent No. 530,021, dated November 27, 1894.

Application filed July 10, 1894. Serial No. 517,120. (No specimens.)

*To all whom it may concern:*

Be it known that I, CHARLES L. COFFIN, of Detroit, in the county of Wayne and State of Michigan, have invented a new and useful Improvement in Methods of Electrically Heating Metal or other Conducting Bodies, of which the following is a specification.

My invention consists in an improved method of electrically heating metal or other conducting bodies.

The drawing is an elevation, partly in section, of an apparatus by which my invention may be practiced.

I some time ago discovered that by connecting a body to be heated with one terminal of a source of electric energy, and then bringing said body in circuit with a liquid electrode connected with the other terminal of said source of electric energy, the solid electrode could be heated, but I also found that this method, which has, since my invention, been publicly shown, required an undue expenditure of mechanical and electrical energy, for the result attained. I then discovered that by heating the solid electrode to about the boiling point of water before bringing it in circuit, a rapid heating effect was attained with comparatively small expenditure of mechanical and electrical energy, and for this discovery have received a patent, dated June 26, 1894, No. 522,151. I have also discovered that by using a liquid electrode the liquid or solution of which contains a substance which volatilizes or evaporates at a comparatively low temperature, I can heat the solid electrode rapidly and economically by putting it in circuit with the liquid electrode without first heating the solid electrode. I believe that this volatile or vaporable constituent acts in two ways—first in surrounding the metal or substance to be heated with a gaseous or vaporous film or envelope which assists in establishing the arc and may primarily provide high initial resistance, and second provides the arc with an inflammable or conducting gas or vaporous medium thereby assisting in securing steady maintenance of the arc, and in supplying the arc with a conducting gas.

I am aware that in the method of heating metal by immersion in a liquid, or electrolyte, as above first described, electrolytic oxygen or hydrogen gas is evolved, as the case may be, and may surround the immersed portion of the metal to be heated. This gas does not perform the function of the volatile or vaporable constituents of the electrolyte as in my invention herein described—being evolved only by electrolysis—whereas the volatile or vaporable body is volatilized or vaporized by the spark at contact, by the heat owing to high initial resistance and ultimately by the combined heat of the heated electrode and the arc. This volatile or vaporable constituent also may act in increasing the conductivity of the electrolyte, and when volatilized or vaporized may increase materially the conductivity of the arc and its gases or vapors.

For the purposes of my invention I find that a saturated solution of borax, carbonate of soda, carbonate of potash, either singly or in combination, to which has been added acetic acid, acetate of potash, phenol, acetone, glycerine, methyl-alcohol, singly or in combination, will provide an electrolyte having sufficient conductivity and affording a volatile or vaporable medium. The proportions of acetone, glycerine or volatile bodies may be varied to suit, and they may be supplied to the electrolyte when from long usage or other reasons the electrolyte has become depleted.

There are many other substances or chemicals which would suggest themselves to chemists or those skilled in the art, and various combinations of these substances could be made to increase or decrease the conductivity of the electrolyte.

A represents a vessel, either insulated or placed on some insulated support, containing the above described solution marked L, which solution is connected by a conductor $y$, either through the medium of the vessel itself or by said conductor, making contact with the solution, with one terminal of a source of electricity.

B represents a cover or bridge on vessel A, insulated therefrom by insulating material I, and connected by conductor $x$ with the other terminal of the generator.

R represents a solid electrode, the thing chosen for illustration in this case being a rivet, to the heating of which this method and apparatus are particularly suited. Electrode R makes contact with bridge or cover B, and is held by said bridge or cover so as to dip just the proper distance desired to be heated, into the liquid electrode L. Of course the bridge or cover B may be omitted, and the electrode R may be grasped by a pair of tongs connected with conductor $x$ and immersed by hand.

With this process I am enabled to use an alternating current to advantage probably because the gaseous envelope, surrounding the electrode to be heated, is not dependent upon electrolytic action. In practice it has been found necessary to use a continuous current, and preferably connect the metal to the negative pole, to secure good action, in the first mentioned process, and it has been found impracticable to use an alternating current. With my process above described I find I may connect the metal to either terminal in the use of a continuous current. I may therefore use either a continuous or alternating current.

What I claim as my invention, and desire to secure by Letters Patent, is—

1. The herein described method of electrically heating metal consisting in bringing the metal in circuit with a liquid electrode containing a substance more volatile or vaporizable than water.

2. The herein described method of electrically heating metal consisting in springing an electric arc between the electrode to be heated and a liquid electrode or electrolyte containing a substance more volatile or vaporizable than water.

3. The herein described method of electrically heating consisting in putting the electrode in circuit with a liquid electrode containing a substance more volatile or vaporizable than water, and whose volatile constituent is inflammable.

4. The herein described method of electrically heating consisting in springing an electric arc between an electrode and a liquid electrode or electrolyte containing a substance more volatile or vaporizable than water, and whose volatile constituent is inflammable.

CHARLES L. COFFIN.

Witnesses:
AMELIA J. WILLIAMS,
HENRY B. LOTHROP.